(No Model.) 4 Sheets—Sheet 1.

J. P. METZGER.
JOURNAL BEARING FOR AXLES.

No. 514,484. Patented Feb. 13, 1894.

WITNESSES:
T. J. Hogan.
F. E. Gaither.

INVENTOR:
J. P. Metzger,
BY
J. Snowden Bell,
ATTORNEY.

(No Model.)  4 Sheets—Sheet 2.
J. P. METZGER.
JOURNAL BEARING FOR AXLES.
No. 514,484.  Patented Feb. 13, 1894.
FIG. 9.
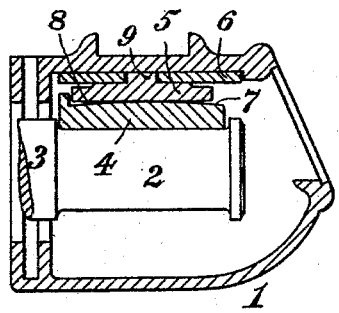
FIG. 10.
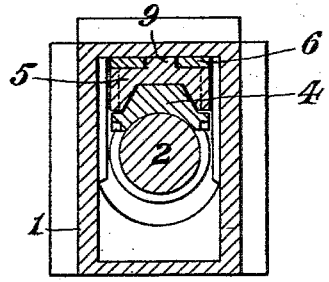
FIG. 11.
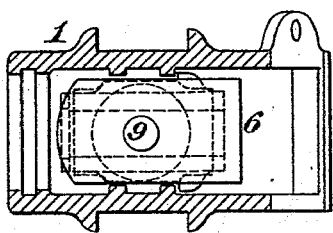
FIG. 12.    FIG. 13.
FIG. 14.
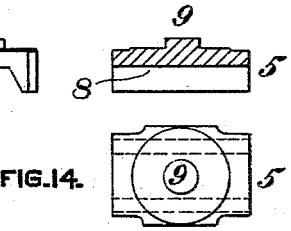
FIG. 15.   FIG. 16.
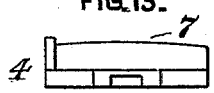 
FIG. 17.
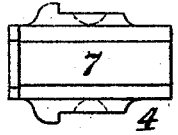
WITNESSES:
T. J. Hogan
F. E. Gaither
INVENTOR:
J. P. Metzger
BY
J. Snowden Bell,
ATTORNEY.

(No Model.) 4 Sheets—Sheet 3.

J. P. METZGER.
JOURNAL BEARING FOR AXLES.

No. 514,484. Patented Feb. 13, 1894.

WITNESSES
T. J. Hogan.
T. E. Gaither.

INVENTOR
J. P. Metzger
BY
J. Snowden Bell
ATTORNEY (No Model.)  4 Sheets—Sheet 4.
J. P. METZGER.
JOURNAL BEARING FOR AXLES.
No. 514,484. Patented Feb. 13, 1894.
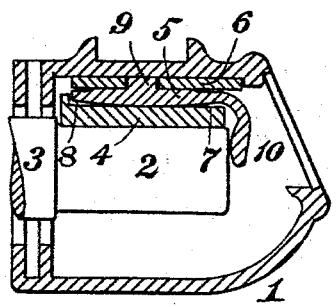
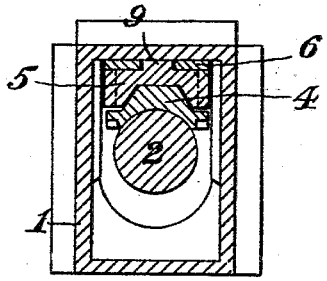
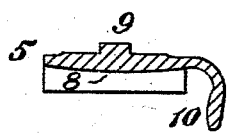
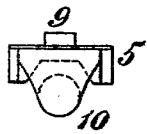
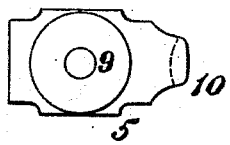
WITNESSES
T. J. Hogan.
T. E. Gaither.
INVENTOR
J. P. Metzger.
BY
Snowden Bell,
ATTORNEY

UNITED STATES PATENT OFFICE.

JULES P. METZGER, OF PATERSON, NEW JERSEY, ASSIGNOR TO THE LESLIE BROTHERS MANUFACTURING COMPANY, OF SAME PLACE.

JOURNAL-BEARING FOR AXLES.

SPECIFICATION forming part of Letters Patent No. 514,484, dated February 13, 1894.

Application filed September 14, 1893. Serial No. 485,494. (No model.)

*To all whom it may concern:*

Be it known that I, JULES P. METZGER, of Paterson, in the county of Passaic and State of New Jersey, have invented a certain new and useful Improvement in Journal-Bearings for Railroad - Axles, of which improvement the following is a specification.

My invention relates to journal bearings of the class or type in which provision is made for the self adjustment of the bearing within and relatively to the journal box in which it is carried, in conformity to variations in the angular relation of the axle thereto, due to vertical and horizontal movements of the axle, an instance of such type being exemplified in Letters Patent of the United States No. 405,040 granted and issued to Edward Leslie, under date of June 11, 1889.

The object of my invention is to provide a journal bearing of the above recited class or type, which shall be of greater sensitiveness as to adjustments than heretofore; in which the fitting of abutting members and the lubrication thereof, as practiced in prior constructions, can be dispensed with; which shall provide a proper end stop for the axle; and in which the bearing proper or brass may conform to the master car builders' standard now in general use.

The improvement claimed is hereinafter fully set forth.

Figure 1:
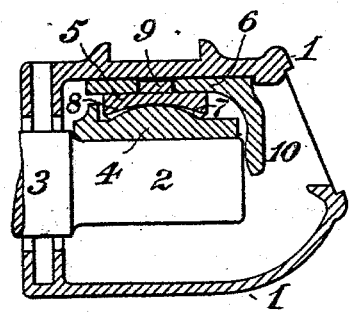
Figure 2:
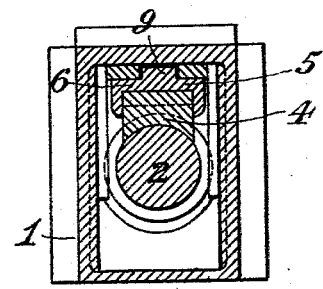
Figure 3:
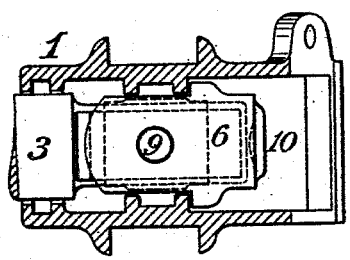
Figure 4:
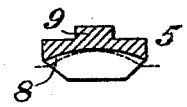
Figure 5:
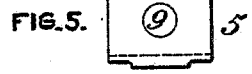
Figures 6, 7:
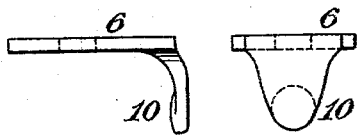
Figure 8:
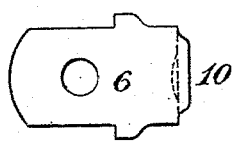
Figure 18:
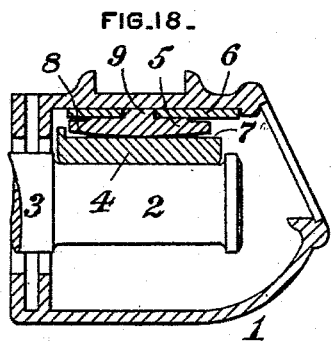
Figure 19:
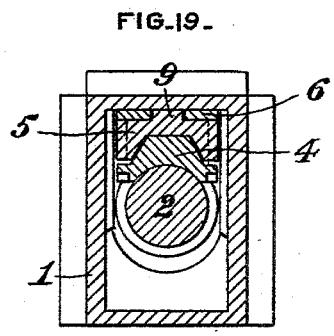
Figure 20:
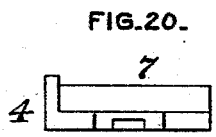
Figure 21:
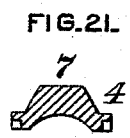
Figure 23:
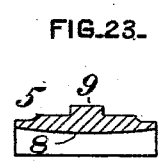
Figure 24:
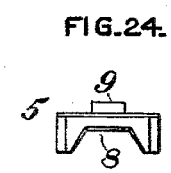
Figure 22:
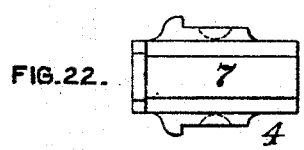
Figure 25:

In the accompanying drawings: Figure 1 is a vertical longitudinal central section through a journal box and bearing illustrating an application of my invention; Fig. 2, a transverse section through the same; Fig. 3, a horizontal section through the journal box, with parts therein shown in plan view; Fig. 4, a longitudinal central section through the intermediate plate; Fig. 5, a plan view of the same; Figs. 6, 7 and 8, side, plan, and front views, respectively, of the key; Figs. 9, 10, and 11, longitudinal, transverse, and horizontal sections respectively, through a journal box and bearing illustrating a modified form of my invention; Figs. 12, 13, and 14, an end view, longitudinal section, and plan view, respectively, of the intermediate plate of Figs. 9 to 11 inclusive; Figs. 15, 16, and 17, a side view, transverse section, and plan view, respectively, of the bearing of Figs. 9 to 11, inclusive; Figs. 18 and 19, longitudinal and transverse sections respectively, through a journal box and bearing illustrating another modified form of my invention; Figs. 20, 21, and 22 a side view, transverse section, and plan view respectively, of the bearing of Figs. 18 and 19; Figs. 23, 24 and 25, a longitudinal section, end view, and plan view, respectively, of the intermediate plate of Figs. 18 and 19; Figs. 26 and 27, longitudinal and transverse sections, respectively, through a journal box and bearing illustrating another modified form of my invention; and Figs. 28, 29 and 30, a longitudinal section, end view, and plan view, respectively, of the intermediate plate of Figs. 26 and 27.

My present invention is an improvement upon that of Letters Patent No. 405,040 aforesaid, and, as in that of said Letters Patent, employs an "intermediate plate," interposed between the journal bearing or brass and the journal box, and adapted to admit of the self adjustment of the bearing in vertical and horizontal movements of the axle.

In prior constructions of the general type referred to, the bearing is longitudinally curved on its top, so as to present a convex portion in the form of a part of a cylinder whose axis is at right angles to the axle journal, and the intermediate plate is correspondingly recessed, so as to fit truly on and over the convex portion of the bearing. It has been demonstrated, in practice, that such construction necessitates extremely accurate and correspondingly expensive fitting of the abutting surfaces of the bearing and intermediate plate, as if the convexity of the bearing be slightly greater than that which will correspond with the recess in the plate, binding and consequent impairment of the durability of the bearing will result, and if the parts are not truly and properly fitted, the bearing surfaces cannot be kept cool. In addition to the accurate fitting of the parts, it has further been necessary to provide oil holes through the intermediate plate and bearing to supply a lubricant to the bearing surfaces. It has also been found even when the requirements above mentioned are complied with, that owing to the comparatively large weight carried by each journal bearing, the corresponding pressure on the abutting surfaces of the journal bearing and plate, renders them, to a substantial degree, rigid, on account of their great adhesion, and they consequently fail to fully and effectively perform their designed functions of providing self adjustment for vertical irregularities of motion of the axle.

Further, in prior constructions of the general type before referred to, the longitudinal play of the journal bearing is limited by stops at the ends of its top, which stops have been found in practice to be worn out quickly by the end movements of the axle, the shocks of which are transferred by the bearing to the intermediate plate and resisted by the key, thereby rapidly wearing these parts and impairing the fit of the hub of the intermediate plate, with a corresponding impairment of the capability of the construction to meet and provide for horizontal irregularities of motion of the axle.

My improvement, which is specially designed to obviate the objections above noted, consists, generally stated, in the combination of a journal bearing, a journal box, and members interposed between the bearing and box, one of said interposed members being pivoted vertically, and one being provided with a longitudinally curved bearing face which abuts against a bearing face not conforming with its curvature, so that said abutting faces shall be in contact only at and adjacent to a common transverse plane; also, in the combination of a journal bearing, a journal box, members interposed between the bearing and box, one of said interposed members being pivoted vertically and one being provided with a longitudinally curved bearing face, and an end stop for an axle formed integral with one of said members.

In the practice of my invention, referring first to Figs. 1 to 8 inclusive, I provide a journal box 1, of the ordinary standard type, which is adapted to receive the journal 2, of a car or locomotive engine axle 3. A journal bearing or brass 4, the under or inner side of which is recessed, in conformity with the curvature of the periphery of the journal 2, is fitted thereon in the usual manner, and two members, to wit: an intermediate plate 5, and key 6, through which the portion of the weight of the car or engine which is borne by the journal 2, is transmitted thereto, are, as in Patent No. 405,040 aforesaid, interposed between the journal bearing 4 and the top of the box 1. A longitudinally curved bearing face 7 is formed upon the top of the journal bearing 4, and the adjacent side of the intermediate plate 5 is recessed to form a bearing face 8, the radius of curvature of which is materially greater than that of the bearing face 7, so that the bearing faces 7 and 8 abut, not throughout their length as in prior constructions, but only in and adjacent to a transverse plane, which is normally at the middle of their length. Under such construction and relation of the abutting bearing faces, they are free to oscillate, one upon the other, with all irregularities, however slight, of vertical movement of the axle, and it will be obvious that the bearing faces will operate satisfactorily as ordinarily cast, and without any fitting, and also that lubrication will not be necessary, so that the weakening of the brass and intermediate plate by the oil holes heretofore employed will be avoided.

The lateral or horizontal movements of the axle are provided for by a vertical pivot 9, formed on the top of the intermediate plate 5 and fitting truly in an opening or socket in the key 6, against which the plate 5 bears, and which is interposed between said plate and the top of the journal box 1, and in order to relieve the pivot 9, and also the bearing 4, from shocks due to end movements of the axle, an end stop 10 may be formed upon the front of the key 6, said stop projecting downwardly in front of the journal 2, and having a convex surface adjacent thereto, so as to accommodate vertical and horizontal movements of the axle, and obviate liability of impairing the adjustability of the bearing to such angular movement. The end play of the axle is limited to the distance between the end of the journal and the adjacent convex face of the end stop 10.

Figs. 9 to 17 inclusive, illustrate a modification in which there is provided the same combination and relation of the journal bearing 4, intermediate plate 5, vertical pivot 9, key 6, and journal box 1, as in the instance first described. The bearing 4 is also provided with a longitudinally and upwardly curved bearing face 7 on its top, but the bearing face 8 of the intermediate plate 5, instead of being curved similarly, but to a larger radius, as before, is, in this case, made flat, thereby causing the bearing faces 7 and 8 to be relieved from contact, except at and adjacent to a single transverse plane, so that the same operative relation of the bearing and intermediate plate as first described is attained. A further structural difference, which does not, however, affect the action or relation of the parts, consists in forming the bearing 4 with its sides inwardly inclined toward its top, and correspondingly recessing the intermediate plate 5, instead of making the lateral abutting face of the bearing and plate vertical as in the first instance. By such change of form, the advantages of my improvement may be attained with the employment of a bearing of the master car builders' standard. The key 6 is not, in this case, shown as provided with an end stop for the axle, but it will be obvious that the same may be employed if desired.

The construction shown in Figs. 18 to 25 inclusive differs from that last described only in the particular that the bearing face 7 of the journal bearing 4 is made flat, while that of the intermediate plate 5 is longitudinally and downwardly curved. It will be seen that the same operative result, in effecting the contact of said bearing faces only at and near a single transverse plane, is attained as in each of the former instances.

Figs. 26 to 30 illustrate a further modification, which is similar to the construction last described, except in the particular that a collarless axle is employed, as in Fig. 1, and the end stop 10, for the axle, is formed upon the front of the intermediate plate 5. The operative relation of, and result attained by, the combination of the parts, accord with those of the forms before described, and, as in the two last preceding instances, the master car builders' standard bearing is employed.

It will be obvious from the foregoing description, that variations of structural detail of my improvement may be made by one skilled in the art, without departure from the leading and essential features of my invention. Thus, for example, the key 6 might be made with a longitudinally curved bearing face on its top, abutting against a flat bearing face, or one curved to a greater radius, on the inner side of the top of the box, the abutting faces of the bearing and intermediate plate being, in such case, made flat or plain. Under such modification, no members other than or additional to those substantially hereinafter described, would be employed, and the several members would be combined, and operate in combination, in the same manner and with the same result.

I claim as my invention and desire to secure by Letters Patent—

1. The combination of a journal box, a journal bearing therein, and members interposed between the box and bearing, one of said interposed members being pivoted vertically, and one being provided with a longitudinally curved bearing face abutting against another bearing face which is not in conformity with the curvature of the bearing face first stated, so that the two abutting bearing faces shall be in contact only at and adjacent to a common transverse plane, substantially as set forth.

2. The combination of a journal box, a journal bearing therein, members interposed between the box and bearing, one of said members being pivoted vertically and one being provided with a longitudinally curved bearing face, and an end stop for an axle formed integral with one of said members, substantially as set forth.

3. The combination of a journal box, a journal bearing therein, an intermediate plate abutting against the journal bearing, a key on which the intermediate plate is vertically pivoted and which abuts against said plate and against the journal box, and a longitudinally curved bearing face located between the journal surface of the journal bearing and the top of the journal box and abutting against another bearing face which is not in conformity with the curvature of the bearing face first named, substantially as set forth.

JULES P. METZGER.

Witnesses:
JOHN BERWICK,
WM. H. LEAZER.